(12) United States Patent
Pancaldi et al.

(10) Patent No.: US 7,662,296 B2
(45) Date of Patent: Feb. 16, 2010

(54) FILTERING AND COMPACTING DEVICE FOR SOLID PARTICLES SUSPENDED AND CONTAINED IN FLUIDS, SUCH AS SLURRY FROM MECHANICAL OPERATIONS

(75) Inventors: Fabio Pancaldi, Calderara Di Reno (IT); Vanni Gallocchio, Abano Terme (IT)

(73) Assignee: P.M.P.O. S.R.L., Calderara Di Reno (IT)

( * ) Notice: Subject to any disclaimer, the term of this patent is extended or adjusted under 35 U.S.C. 154(b) by 9 days.

(21) Appl. No.: 11/859,534

(22) Filed: Sep. 21, 2007

(65) Prior Publication Data
US 2008/0078726 A1 Apr. 3, 2008

(30) Foreign Application Priority Data
Sep. 28, 2006 (IT) .......................... RE2006A0114

(51) Int. Cl.
*B01D 37/00* (2006.01)
*B30B 9/06* (2006.01)

(52) U.S. Cl. ........................ 210/770; 210/772; 210/791; 210/797; 210/415; 100/37; 100/110; 100/111; 100/127

(58) Field of Classification Search ...................... None
See application file for complete search history.

(56) References Cited

U.S. PATENT DOCUMENTS

| | | | | |
|---|---|---|---|---|
| 336,425 A | * | 2/1886 | Ockershausen | 210/298 |
| 1,525,449 A | * | 2/1925 | Johnson | 210/415 |
| 1,548,109 A | * | 8/1925 | Thornton | 23/308 S |
| 1,977,480 A | * | 10/1934 | Hiller et al. | 210/230 |
| 2,796,146 A | * | 6/1957 | Hersey, Jr. et al. | 55/294 |
| 2,889,048 A | * | 6/1959 | Nordin | 210/409 |
| 3,055,290 A | * | 9/1962 | Arvanitakis | 100/116 |
| 3,168,467 A | * | 2/1965 | Dreyer | 210/108 |
| 3,221,886 A | * | 12/1965 | Lamort | 210/298 |
| 3,256,995 A | * | 6/1966 | Schmid et al. | 210/411 |
| 3,278,031 A | * | 10/1966 | Rosaen | 210/106 |
| 3,311,235 A | * | 3/1967 | Ahlfors et al. | 209/270 |

(Continued)

FOREIGN PATENT DOCUMENTS

EP   1559469 A2  *  8/2005

(Continued)

OTHER PUBLICATIONS

United States Patent & Trademark Office Schedule—Liquid Purification or Separation, Oct. 2006, 14 pages.*

(Continued)

*Primary Examiner*—Robert James Popovics
(74) *Attorney, Agent, or Firm*—Browdy & Neimark, PLLC

(57) ABSTRACT

A filtering and compacting device for solid particles suspended and contained in fluids, such as slurries produced by mechanical operations, comprises a container (11), provided with a cover (12) and an openable bottom (13), and includes an inlet mouth (91) of the fluid to be treated, means for placing the container (11) under pressure, means (20) for opening the bottom (13) of the container (11), in which bottom (13) there is located a first filtering element (90) for retaining the solid particles internally thereof and at least a second filtering element (30) which defines a filtration chamber (31), in which the filtration chamber (31) overlies a compacting chamber (32) of filtered slurry.

13 Claims, 4 Drawing Sheets

U.S. PATENT DOCUMENTS

| | | | | |
|---|---|---|---|---|
| 3,574,509 A * | 4/1971 | Zentis et al. | | 210/107 |
| 3,662,897 A * | 5/1972 | Huff | | 210/523 |
| 3,796,316 A * | 3/1974 | Matz | | 210/332 |
| 3,845,863 A * | 11/1974 | Savia | | 209/303 |
| 3,850,094 A * | 11/1974 | Shontz | | 100/219 |
| 3,850,802 A * | 11/1974 | Berger | | 210/106 |
| 3,900,403 A * | 8/1975 | Randle et al. | | 210/350 |
| 3,910,173 A * | 10/1975 | Zepponi | | 99/277.1 |
| 3,923,605 A * | 12/1975 | Gedde | | 435/290.1 |
| 3,953,325 A * | 4/1976 | Nelson | | 209/273 |
| 3,954,613 A * | 5/1976 | Worlidge | | 210/108 |
| 3,984,320 A * | 10/1976 | Barefoot | | |
| 4,022,694 A * | 5/1977 | Fruman | | 210/350 |
| 4,029,486 A * | 6/1977 | Frantz | | 96/137 |
| 4,128,480 A * | 12/1978 | Lumsden | | 210/332 |
| 4,157,959 A * | 6/1979 | Wen et al. | | 210/807 |
| 4,208,188 A * | 6/1980 | Dick, Jr. | | 44/596 |
| 4,290,785 A * | 9/1981 | Alldredge | | 95/276 |
| 4,297,209 A * | 10/1981 | DeVisser et al. | | 210/107 |
| 4,343,233 A * | 8/1982 | Burgin | | 100/116 |
| 4,346,653 A * | 8/1982 | Rodak | | 100/37 |
| 4,347,137 A * | 8/1982 | Dick, Jr. | | 210/329 |
| 4,379,058 A * | 4/1983 | Bolton | | 210/791 |
| 4,420,404 A * | 12/1983 | Coate et al. | | 210/808 |
| 4,660,608 A * | 4/1987 | Arai | | 141/12 |
| 4,676,079 A * | 6/1987 | Czauderna | | 68/242 |
| 4,703,611 A * | 11/1987 | Young | | 53/529 |
| 4,776,962 A * | 10/1988 | Wakeman | | 210/748 |
| 4,818,402 A * | 4/1989 | Steiner et al. | | 210/411 |
| 4,842,722 A * | 6/1989 | Holz | | 209/270 |
| 4,995,972 A * | 2/1991 | Kramer et al. | | 210/179 |
| 5,143,220 A * | 9/1992 | Young et al. | | 209/17 |
| 5,144,889 A * | 9/1992 | Alig et al. | | 100/74 |
| 5,152,891 A * | 10/1992 | Netkowicz et al. | | 210/408 |
| 5,164,079 A * | 11/1992 | Klein | | 210/186 |
| 5,192,429 A * | 3/1993 | Bader | | 210/170.09 |
| 5,236,583 A * | 8/1993 | Wang | | 210/181 |
| 5,263,411 A * | 11/1993 | Gourdol | | 100/98 R |
| 5,325,655 A * | 7/1994 | Doleh | | 53/436 |
| 5,341,936 A * | 8/1994 | Young | | 209/17 |
| 5,366,626 A * | 11/1994 | Pierson | | 210/216 |
| 5,401,396 A * | 3/1995 | Lescovich et al. | | 210/108 |
| 5,587,074 A * | 12/1996 | Lynch et al. | | 210/411 |
| 5,595,655 A * | 1/1997 | Steiner et al. | | 210/391 |
| 5,629,033 A * | 5/1997 | Lienau | | 425/353 |
| 5,662,805 A * | 9/1997 | Cameron et al. | | 210/709 |
| 5,667,683 A * | 9/1997 | Benian | | 210/409 |
| 5,824,229 A * | 10/1998 | Larkey et al. | | 210/741 |
| 5,855,794 A * | 1/1999 | Caracciolo, Jr. | | 210/739 |
| 5,961,827 A * | 10/1999 | Bahr | | 210/387 |
| 6,110,388 A * | 8/2000 | Norais et al. | | 210/770 |
| 6,402,948 B1 * | 6/2002 | Pakki et al. | | 210/223 |
| 6,475,397 B1 * | 11/2002 | Sanderson | | 210/791 |
| 6,520,752 B1 * | 2/2003 | Hosford | | 417/313 |
| 7,294,257 B2 * | 11/2007 | Jackson | | 210/167.21 |
| 7,383,766 B2 * | 6/2008 | McIntosh et al. | | 100/92 |
| 7,413,086 B2 * | 8/2008 | Kato et al. | | 209/300 |
| 2005/0167373 A1 | 8/2005 | Pancaldi et al. | | |
| 2008/0078726 A1* | 4/2008 | Pancaldi et al. | | 210/770 |

OTHER PUBLICATIONS

United States Patent & Trademark Office Definitions—Liquid Purification or Separation, Oct. 2006, 129 pages.*
United States Patent & Trademark Office Schedule—Presses, Dec. 2000, 6 pages.*
United States Patent & Trademark Office Definitions—Presses, Dec. 2004, 92 pages.*
English language Abstract of Italian patent application PD2004A000028 filed Jan. 30, 2004.

* cited by examiner

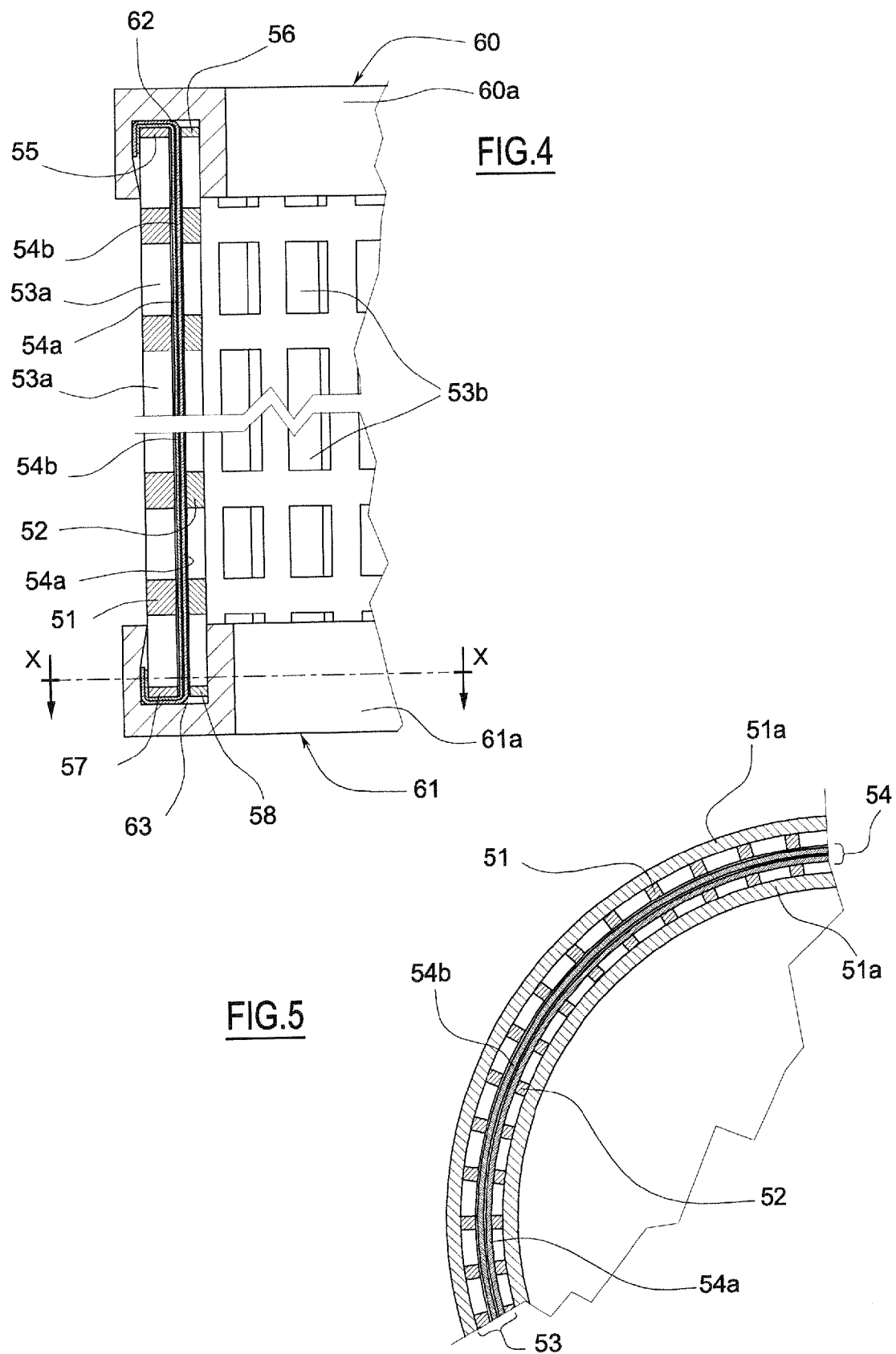

FILTERING AND COMPACTING DEVICE FOR SOLID PARTICLES SUSPENDED AND CONTAINED IN FLUIDS, SUCH AS SLURRY FROM MECHANICAL OPERATIONS

The invention relates, in a general sense, to a filtering and compacting device for slurry from mechanical operations, and more in general for fluids containing solid suspended particles.

As is known, in all mechanical working which gives rise to the formation of swarf, such as lathing, milling, grinding etc., jets of coolant fluids are usually used for removing the swarf.

The problem arises of how to treat these fluids, a treatment which is made necessary by a series of motives.

A first motive is of an ecological nature, and requires that the slurry formed with the water be separated in order to enable recycling or discharge of the water into the environment.

A second motive is economical, inasmuch as the slurry contains considerable quantities of swarf and when the workpiece is made of a precious material, the recuperation of the swarf takes on a considerable economic importance.

A third motive is the need to obtain a perfect and complete separation of the filtered material from the treated liquid.

A last but no less important motive is the need to improve the level of safety in the workplace.

With special reference to recuperation liquids in mechanical working, these can be constituted by water, water/oil emulsions or just oil.

The recuperation of the liquids is particularly relevant in fine working, for example lapping, of metal surfaces covered by precious and expensive materials, such as for example nickel.

Known plants for treatment of residual slurries of mechanical working comprise, among other things, filtering means, in series or parallel, which are constituted by a toroidal filtering cartridge located in a cylindrical box which is subdivided by the cartridge into two concentric parts, in which the central part can communicate with the outside also through an opening on the bottom of the box for evacuating the slurry.

These plants also comprise one or more devices for separating and recuperating the slurry, constituted by tubular containers which include an upper inlet mouth for the slurry to be treated, means for pressurizing the container, means for opening the bottom of the container, in which bottom there is also a filtering element which can retain the solid part of the slurry.

Italian patent application no. PD2004A000028 describes a separating and recuperating device of slurry of the above-mentioned type.

The aim of the present invention is to realize a filtering and compacting device for slurry from mechanical working which is particularly compact and functional.

A further aim of the present invention is to realize a filtering and compacting device for slurry which device is particularly efficient.

These aims are attained by a filtering and compacting device for slurry from mechanical operations, as described in claim 1, to which reference is made for the sake of brevity.

Further characteristics of the invention are indicated in the following claims.

Further characteristics and advantages of the invention will emerge from a reading of the following description, provided by way of non-limiting example with the aid of the figures illustrated in the enclosed tables of the drawings, in which:

FIG. 4 is a lateral view in section of the filter of FIG. 3; and

FIG. 5 is a view in section of FIG. 4, made along line X-X of FIG. 4.

Figure 1:
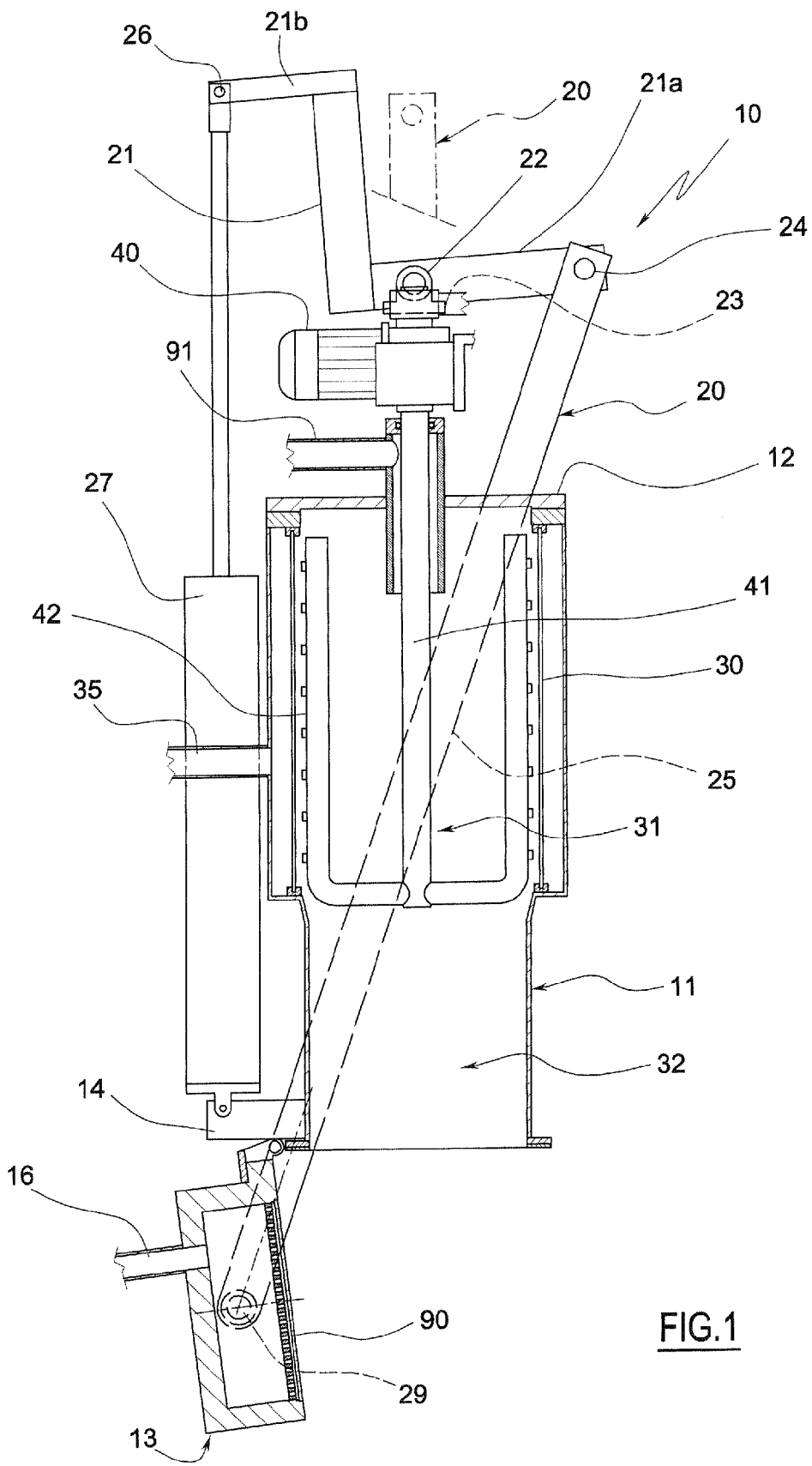
FIG. 1 is a partially-sectioned lateral view of the device of the invention.

With reference to FIG. 1, a filtering and separating device of liquids from slurry and for compacting the slurry resulting from mechanical operations is shown, according to the present invention and denoted in its entirety by the number 10.

The device 10 comprises a tubular container which is closed at a summit thereof by a cover 12 and comprises an openable bottom 13 for discharging the slurry.

The bottom 13 is hinged to the container 11 by means for hinging 14.

One or more sieve filtering elements 90 are located in the bottom 13 of the container 11, which sieve elements 90 retain the solid part of the slurry.

The surface of the sieve 90 substantially covers the whole lower end section of the container 11.

The container 11 is fed with slurry to be filtered removed from a collection reservoir (not illustrated in the figures of the drawings) through an inlet 91 for the liquid to be filtered, the inlet being located above the above-mentioned container 11.

Also present are means for pressurizing the inside of the container 11.

The bottom 13 exhibits a collection bowl for the liquids extracted from the slurry, as well as an outlet channel 16 for the liquids.

The device 10 further comprises means 20 for opening and closing the bottom 13. The means 20 consist in a toggle mechanism having a lever 21 and a horizontal-axis hinge 22, in which the hinge 22 is supported by supports which are solidly constrained to the cover 12.

The lever 21 is solidly coupled at a first end 21a thereof, by a first rotating coupling 24, to a tie rod 25 for opening and closing the bottom 13, and at a second end 21b thereof is connected by a second rotating coupling 26 to an actuator 27, the actuator 27 being fixed to the container 11.

The tie rod 25 is coupled to the bottom 13 by means of a third rotating coupling 29.

In FIG. 1 the means for opening and closing 20 the bottom 13 are illustrated in the open position.

The means for opening and closing 20 are represented in the closed position by a broken line, which is when the bottom 13 of the container 13 is closed.

In the closed position, the special conformation of the means 20 is such as to resist the compacting pressure of the slurry, thanks to the geometry of the system.

When the bottom 13 is closed and the container 11 is under pressure, the force applied by the internal pressure on the bottom 13 cannot generate any momentum which would be able to open the bottom 13, as there is no lever arm leading to the generation of any momentum.

Further, the container 11 internally exhibits a filter 30 defining a filtration chamber 31, in which the filtration chamber 31 overlies a compacting chamber 32 of the filtered slurry.

The compacting chamber 32 is therefore defined by the lower part of the container 11 when closed.

The filtration chamber 31 further exhibits an outlet 35 for the filtered liquid.

Figure 2:
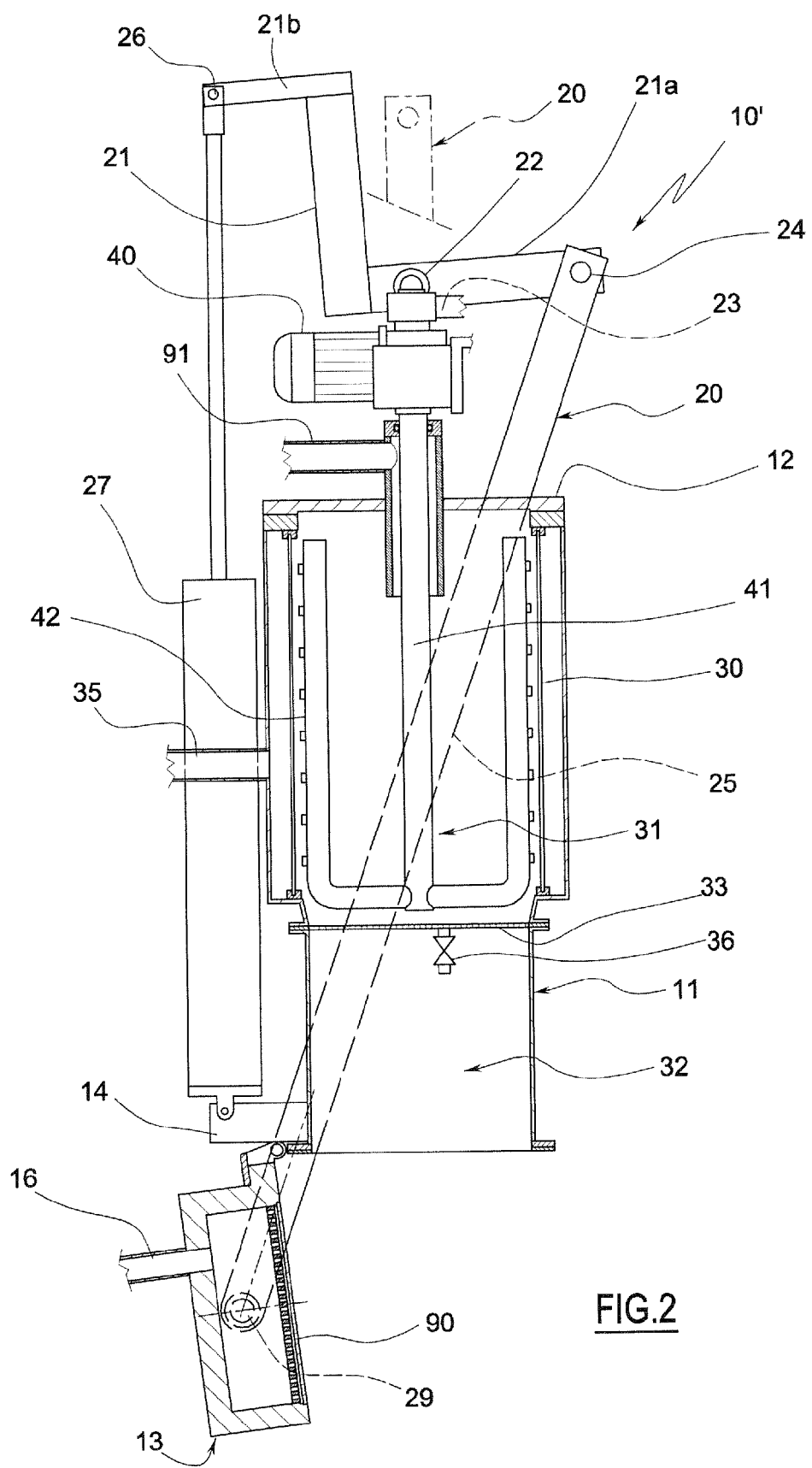
FIG. 2 is a partially-sectioned lateral view of an alternative embodiment of the invention.
Figure 3:
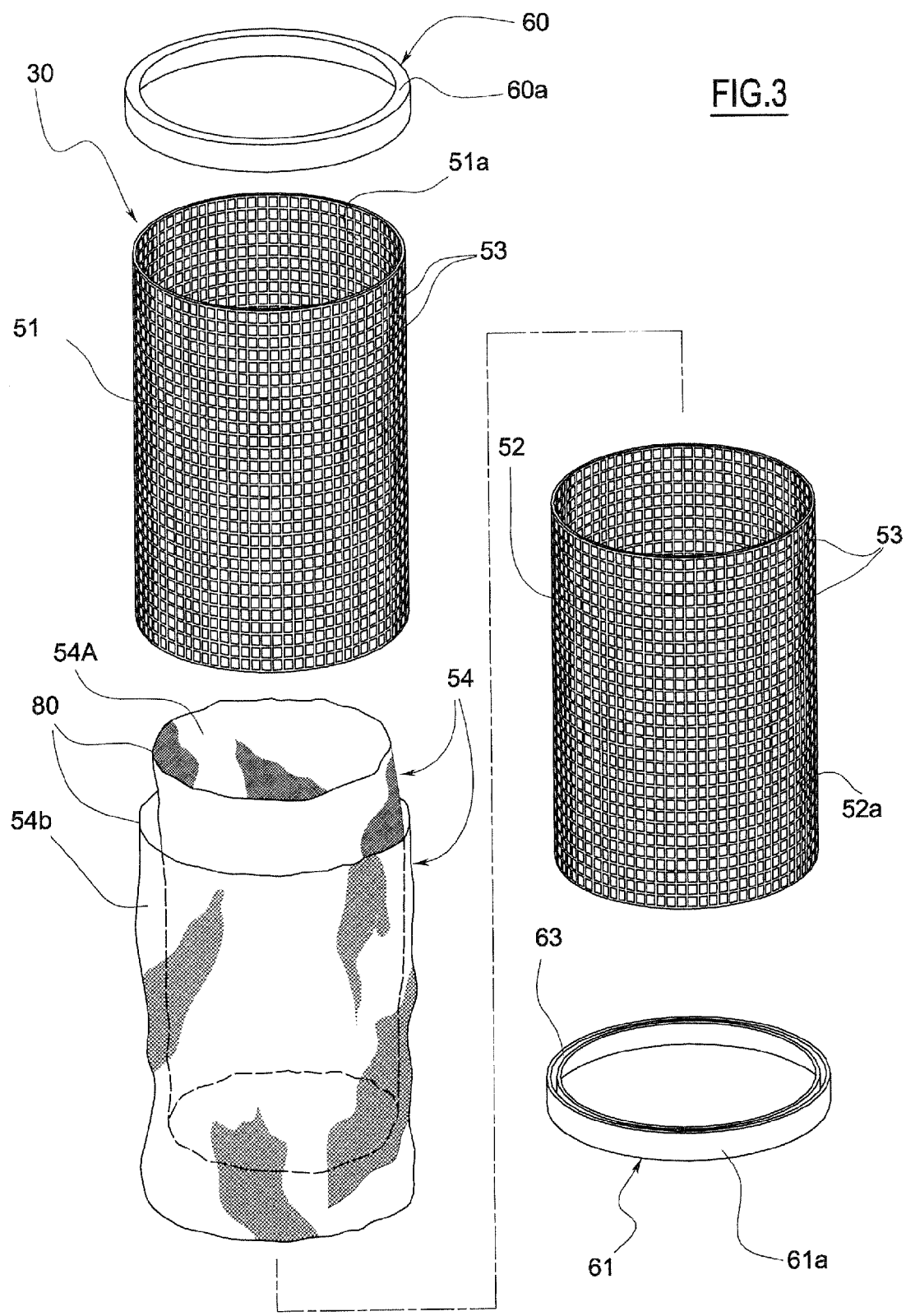
FIG. 3 is an exploded view of a filter which can be used with the device of the present invention.

In an alternative embodiment of the present invention, denoted in its entirety by 10' and illustrated in FIG. 2, the filtration chamber 31 is separated from the compacting chamber 32 by a diaphragm 33.

Further, in this case the filtration chamber 31 can be placed in communication with the compacting chamber 32 by a valve 36, which valve can open in order to transfer the slurry captured by the filter 30 towards the compacting chamber 32.

The described device further comprises a motor 40 which via a shaft 41 can set a U-shaped washing element 42 in rotation.

The element is made up of tubular elements in which the water enters from the inlet tube 23, provided with a rotating joint (not illustrated), and exits from nozzles facing towards the filter 30.

The washing element 42 is located internally with respect to the filter 30 and at a short distance from the filter itself.

In more detail, the filter 30 used in the present invention can be composed of a first and a second tubular body 51 and 52, both having a net structure and both exhibiting a plurality of quadrangular windows 53.

The two tubular bodies 51 and 52 are concentric and the internal surface 51a of the first tubular body 51 is adjacent to the external surface 52a of the second tubular body 52.

The first and the second tubular bodies 51 and 52 are arranged reciprocally such that the windows of the first correspond to the windows 53b of the second.

A layer of sieve 54 is located between the two tubular bodies 51 and 52, which retains the filings caused by mechanical working. The layer of sieve 54 is composed of a first internal layer 54a and a second external layer 54b.

The end portions 80 of the layers 54a and 54b are turned over to cover the upper and lower end sections 55 and 57 of the first tubular body 51.

The upper and lower end sections of the second tubular body 52 are respectively denoted by 56 and 58.

The upper and lower end sections of the first and second tubular bodies 51 and 52 are each sealed by a sealing edge, which pinches the end portion 80 on the end sections of the first tubular body 51. The upper sealing edge is denoted by 60, while the lower sealing edge is denoted by 61.

Each of the sealing edges 60 and 61 is constituted by a seal ring, respectively denoted by 60a and 61a.

Each seal ring 60a and 61a is provided with a fissure, respectively 62 and 63; the end sections 55 and 56 reversibly insert in the fissure 62 of the upper ring 60a, and the end sections 57 and 58 reversibly insert in the fissure 62 of the lower ring 61a.

The device of the invention operates according to the following description.

The slurry to be treated is made to enter the tubular container 11 through the inlet 91, with the container 11 closed, i.e. with the bottom 13 closed.

The inside of the container 11 is pressurized and a first static filtration is made thanks to the presence of the filter 30 and to the effect of the internal pressure on the slurry.

This phenomenon generates a certain quantity of filtered liquid which can be made to exit the filtration chamber 31 through the outlet 35, from where it can be recuperated.

The denser portion of the slurry drops to the bottom 13 of the container 11, in particular to the sieve 90, forming a layer which itself becomes a further and denser filter for the overlying slurry.

As for the sieve 90, the powder of the metal filings remaining in the liquid comes mostly from the initial stage of the slurry compression, due to the internal pressure in the container 11. In this stage the deposits on the sieve 90 are small and the finest powder of the metal swarf is substantially free to slide through the sieve 90.

More pressure is introduced into the container 11 such that the sieve 90 expels the residual water in the slurry through the outlet channel 16 for the liquids extracted from the slurry.

A metallic brick is progressively formed on the sieve 90, which can be removed by opening the bottom 13 by means of the toggle mechanism described herein above.

The bricks, after being removed, can be recuperated and founded once more in the furnace.

In the embodiment of FIG. 2, similarly to the previous case, after the slurry to be treated has been made to enter, the inside of the container 11 is pressurized and a first static filtration carried out thanks to the presence of the filter 30, while the valve 36 of the diaphragm 33 is closed.

The liquid filtered in this way is made to exit the filtration chamber 31 through the exit 35.

Thereafter, the filtration chamber 31 is set in communication with the compacting chamber 32 by opening the valve 36 which opens in order to transfer the slurry captured by the filter 30 towards the compacting chamber 32. The container 11 is then once more pressurized such as to generate pressure internally thereof, especially also in the compacting chamber 32.

In this way the densest portion of the slurry is collected on the sieve 90, which expels the residual water of the slurry through the outlet channel 16.

In this case too a metal brick is progressively formed on the sieve 90, which can be removed by opening the bottom 13 by means of the toggle mechanism.

The device of the invention, and in particular the filter 30, in both described embodiments 10 and 10', can be washed with cleaning water.

To wash the device, the motor 40 is activated to set the shaft 41 in rotation and therefore the washing element 42 too, after the cleaning water has been put into the filter 30, so that the filter 30 can be washed.

The present invention therefore provides a device which marries the slurry filtering functions to the slurry compacting functions, all within a limited space and with obvious advantages in plant costs.

Obviously modifications or improvements may be made to the invention as it is described herein, dictated by contingencies or special situations, without its forsaking the ambit of the invention as it is claimed herein below.

The invention claimed is:

1. A filtering and compacting device for solid particles suspended and contained in a liquid, comprising:
    a container (11), provided with a cover (12) and an openable bottom (13),
    the container (11) including a liquid inlet mouth (91) for entry into the container (11) of the liquid containing solid particles to be treated,
    means for placing the liquid containing solid particles within the container (11) under pressure,
    means (20) for opening the bottom (13) of the container (11),
    wherein the bottom (13) comprises a first filtering element (90) for retaining the solid particles,
    wherein inside the container (11) at least a second filtering element (30) is provided,
    said second filtering element defining a filtration chamber (31) overlying a compacting chamber (32),
    said compacting chamber (32) being closed by the bottom (13) of the container (11).

2. The filtering and compacting device of claim 1, characterised in that the filtration chamber (31) is separated from the compacting chamber (32) by a diaphragm (33) provided with a valve (36).

3. The filtering and compacting device of claim 2, characterised in that the first filtering element is composed of a sieve (90) for retaining the solid particles and in that a surface of the sieve (90) interests all of a lower end section of the bottom of the container (11).

4. The filtering and compacting device of claim 1, characterised in that the first filtering element is composed of a sieve (90) for retaining the solid particles and in that a surface of the sieve (90) interests all of a lower end section of the bottom of the container (11).

5. The filtering and compacting device of claim 4, characterised in that the bottom (13) of the container (11) exhibits a collection basin for liquids extracted from the slurry and an outlet channel (16) for the liquids.

6. The filtering and compacting device of claim 5, characterised in that the tie rod (25) is coupled to the bottom (13) by means of a third rotating coupling (29).

7. The filtering and compacting device of claim 1, characterised in that the means (20) for opening and closing the bottom (13) of the container (11) comprise a toggle system having a lever (21) and a horizontal-axis hinge (22), in which at a first end (21a) thereof the lever (21) is solidly coupled by a first rotating coupling (24) to a tie rod (25) for opening and closing the bottom (13), and is connected at a second end (21b) thereof, by a second rotating coupling (26), to an actuator (27) fixed to the container (11); with the cover in the closed position, the rotating couplings (22, 24, 29) being aligned such that the cover can be opened only by rotating the hinge (22).

8. The filtering and compacting device of claim 1, characterised in that the filtration chamber (31) exhibits at least an outlet (35) for the filtered liquid.

9. The filtering and compacting device of claim 1, characterised in that it comprises a washing element (42) associated to a shaft (41) set in rotation by a motor (40).

10. The filtering and compacting device of claim 9, characterised in that the second filtering element (30) comprises at least a second tubular support body (52) having a net structure and exhibiting a plurality of windows (53) and being arranged concentrically of and around the outside of the first tubular support body (51), a layer of sieve (54) for retaining solid parts present in the fluid to be filtered being located between the two tubular bodies (51, 52) for retaining solid parts present in the fluid to be filtered, the second tubular body (52) being supported by ring-shaped sealing edges (60, 61).

11. The filtering and compacting device of claim 1, characterised in that the second filtering element (30) comprises at least a first tubular support body (51) having a net structure and exhibiting a plurality of windows (53), a layer of sieve (54) resting externally of the at least a first tubular body (51), which layer of sieve (54) retains solid parts present in the fluid to be filtered, the tubular body (51) being supported by ring-shaped sealing edges (60, 61).

12. A process for separating a solid part from a liquid comprising solid particles, using a plant, characterised in that it comprises at least following stages:
  introducing a first liquid containing solids to be treated into an openable tubular container (11) with the tubular container (11) having a closed bottom comprising a first filter element (90);
  pressuring the first liquid in the tubular container (11) while the container (11) is closed in order to generate a static filtration through a second filtering element (30);
  recuperating a quantity of filtered liquid which has been filtered from the first liquid through an outlet (35) for the first liquid;
  forming a denser portion of the solids after percolation through the first filtering element (90);
  expelling further filtered liquids by discharge from a bottom (13) of said openable tubular container and progressively forming a brick of the denser portion of the solids part on the first filtering element (90);
  opening the bottom (13) of the container (11) for discharging the brick.

13. The process for separating of claim 12, characterised in that during the first static filtering, the filtration chamber (31) is separated from the compacting chamber (32) by a diaphragm (32).

* * * * *